(12) United States Patent
Coppuck

(10) Patent No.: US 11,077,813 B2
(45) Date of Patent: Aug. 3, 2021

(54) IMPACT ENERGY ABSORBING STRUCTURE

(71) Applicant: Gordon Murray Design Limited, Shalford (GB)

(72) Inventor: Frank Coppuck, Hook (GB)

(73) Assignee: Gordon Murray Design Limited, Shalford (GB)

( * ) Notice: Subject to any disclaimer, the term of this patent is extended or adjusted under 35 U.S.C. 154(b) by 180 days.

(21) Appl. No.: 16/075,872

(22) PCT Filed: Jan. 24, 2017

(86) PCT No.: PCT/EP2017/051391
§ 371 (c)(1),
(2) Date: Aug. 6, 2018

(87) PCT Pub. No.: WO2017/137247
PCT Pub. Date: Aug. 17, 2017

(65) Prior Publication Data
US 2019/0077348 A1 Mar. 14, 2019

(30) Foreign Application Priority Data

Feb. 9, 2016 (GB) .................................. 1602283

(51) Int. Cl.
*B60R 19/34* (2006.01)
*B62D 21/15* (2006.01)

(52) U.S. Cl.
CPC .............. *B60R 19/34* (2013.01); *B62D 21/15* (2013.01)

(58) Field of Classification Search
CPC ... B60R 19/34; B60R 19/18; B60R 2019/247; B60R 19/023; B60R 19/03; B60R 19/24; B60R 2019/1813; B60R 2019/262
(Continued)

(56) References Cited

U.S. PATENT DOCUMENTS 2,105,713 A * 1/1938 Werdehoff ............. B62D 21/02
280/797
4,152,012 A * 5/1979 Reidelbach .......... B62D 21/152
280/784
(Continued)

FOREIGN PATENT DOCUMENTS

CN 101544218 A 9/2009
CN 102795181 B 7/2015
(Continued)

OTHER PUBLICATIONS

International Searching Authority, European Patent Office, International Search Report and Written Opinion, International Application No. PCT/EP2017/051391, dated Mar. 1, 2017, 14 pages.

*Primary Examiner* — D Glenn Dayoan
*Assistant Examiner* — Sunsurraye Westbrook
(74) *Attorney, Agent, or Firm* — Sunstein LLP

(57) ABSTRACT

An axially compressible energy absorbing member for a vehicle comprising a thin-walled tube having at least two adjacent, substantially parallel, axially-extending passageways defined by tube walls and separated where they are adjacent by a wall section, wherein the wall section includes one or more apertures of predetermined shape(s) and/or size(s), and wherein the thickness of the tube walls and of the wall section is substantially constant and the same.

15 Claims, 2 Drawing Sheets

(58) Field of Classification Search
USPC ....... 293/133, 120, 154, 115, 122, 124, 117,
293/102; 296/187.09, 187.1, 187.05, 205,
296/193.02, 70
See application file for complete search history.

(56) References Cited

U.S. PATENT DOCUMENTS

| | | | | |
|---|---|---|---|---|
| 8,123,263 | B2 * | 2/2012 | Evans | ..................... B60R 19/18 |
| | | | | 293/132 |
| 2005/0110285 | A1 * | 5/2005 | Glasgow | ................ B62D 21/15 |
| | | | | 293/133 |

FOREIGN PATENT DOCUMENTS

| | | | | |
|---|---|---|---|---|
| CN | 204506806 U | 7/2015 | | |
| CN | 103625401 B | 8/2015 | | |
| EP | 1829752 A1 | 9/2007 | | |
| JP | S49 38316 | 4/1974 | | |
| JP | H11342862 A | * 10/1998 | ............ | B62D 21/15 |
| JP | 11-342862 A | 12/1999 | | |
| JP | 2000-335441 A | 12/2000 | | |
| JP | 2006-62558 A | 3/2006 | | |
| JP | 2016/155509 A | 9/2016 | | |
| WO | WO 2017/137247 | 8/2017 | | |

* cited by examiner

IMPACT ENERGY ABSORBING STRUCTURE

FIELD OF THE INVENTION

The present invention relates to an impact energy absorbing or crash structure for a vehicle, particularly but not exclusively an automotive vehicle such as a car.

BACKGROUND ART

It is known to provide cars with structures which absorb the energy caused by an impact or crash in order to protect the occupants of the vehicle; many such structures absorb energy by deforming under the force of an impact. One such structure is a vehicle bumper, or fender. These are mounted at the front and rear of the vehicle, and attached to the vehicle chassis; they absorb the energy of a frontal (or rear) impact, and absorb some energy through deforming and transfer the remainder of the energy to the vehicle chassis. In the case of a severe impact, the energy transferred to the chassis can be sufficient to deform the chassis; whilst this is helpful in protecting the vehicle occupants, a vehicle with a deformed chassis will be unsafe to drive and expensive to repair. Accordingly, it has become common to provide vehicles with longitudinal, or axially aligned (i.e. aligned along the usual direction of motion of the vehicle), elements known as 'crush boxes', 'crush cans' or 'crash rails' extending between the vehicle chassis and the bumper; these elements are an integral part of the vehicle structure and are adapted to be axially compressible in the event of a crash, so that their compression, which is enabled by their deformation, absorbs energy which would otherwise have been sufficient, if transferred to the chassis, to deform the chassis and/or could cause the vehicle occupants harm. These crush boxes may be 'sacrificial', that is, they are designed to deform in preference to the chassis, so that in the event of a crash, only the crush box(es) need to be replaced, the remainder of the chassis being undamaged. Conventional crush boxes are shown in GB2299551, GB2503095, P2002249078, JP2005162049 and U.S. Pat. No. 6,003,930, for example. Such axially compressible energy absorbing members or crash rails have to be sufficiently strong to be able to support the weight and dynamic loadings imposed by the bumper and any other attachments when the vehicle is in normal use, and they are usually designed so as to deform in a predetermined and controlled manner. Often they are in the form of thin-walled tubes, designed so as to deform in preference to other parts of the vehicle structure—for example, so as to absorb most if not all of the energy of a low- to medium-energy impact; after such an impact, it would be necessary to replace the compressed/deformed crash rail. Whilst this is a fairly lengthy task, it is preferable to having to repair or replace the chassis. In the event of a higher energy impact, the design may depend on the deformation of the bumper to absorb some of the impact energy, and in the most severe situations, the chassis too will deform, so as to absorb energy and protect the passengers. There is a need for a crash rail which is capable of reliably absorbing impact energies and deforming in an accurately controlled manner whilst enabling easy replacement when it has become deformed.

SUMMARY OF THE INVENTION

The present invention therefore provides, in a first aspect, a longitudinally compressible energy absorbing member for a vehicle comprising an elongate thin-walled tube having at least two adjacent, substantially parallel, longitudinally-extending passageways defined by tube walls and separated where they are adjacent by a web or wall section, wherein the wall section includes one or more apertures of predetermined shape(s) and/or size(s), and wherein the thicknesses of the tube walls and of the wall section throughout are substantially the same and substantially constant.

Such an arrangement, which can be relatively easily manufactured (as will be described below), provides a crush box which will deform under impact in a precisely predetermined and controlled manner, which can be easily joined or mounted to the vehicle structure or chassis, fixedly by welding for example, or releasably by bolts or other releasable fixings. When the member has been deformed after an impact, it can be readily replaced, particularly where it is releasably mounted. Moreover, it is relatively easy to 'tune' the deformation/energy absorbing characteristics of the member to suit different applications, by varying the number, sizes, shapes and/or configurations of the passageways or the apertures, and/or by varying the wall and wall section thickness and/or the length of the passageways. The thickness of the structure defining the passageways is preferably substantially constant, the thickness around the entire circumference of the member being the same as the thickness of the common wall section separating the passageways. This is significant as it enables the amount of material used in fabricating the member to be minimised, so the member can be as light as possible whilst still having the necessary strength and deformation characteristics. Preferably the member is formed by fabricating a longitudinal box section and a longitudinal, generally C-shaped section and joining the edges of the C-shaped section to the box section so that the member has constant wall thickness throughout, with the two passageways separated by the wall section which is part of the wall of the box section. Such an arrangement provides a structure which has no overlapping edges, which is advantageous because it avoids the situation where parts of the structure overlap, leaving surfaces which are unable to receive a protective coating (see, for example, EP1829753, FIGS. 3 and 6).

The passageways may have the same cross-sectional length, area and/or shape, or they may differ. For example, they may be rectangular. Similarity of these features facilitates calculation of their deformation/energy absorbing characteristics. The apertures may be the same shape, which again facilitates the deformation/energy absorbing calculation; the apertures may have the same size, for the same reason, or they may vary in size so as to allow the member deform in a predetermined manner, so that one part of the member deforms before another part.

The member may comprise two or more longitudinal portions which in use are releasably connected to each other end to end, wherein the two portions differ in at least their lengths. Such an arrangement can be used to provide for one portion alone to deform under impacts of a certain intensity, and for that portion and the other portion or portions to deform under a higher intensity impact. Where there are more than two portions it would be a relatively easy matter to design the portions of the member so that they deform successively, as the impact intensity increases.

The two sections may differ in that the thickness of the wall section and the remainder of the thin-walled tube in each portion is substantially the same, but the thicknesses of the two portions are different. This further allows the deformation characteristics of the member to be 'tuned' for a particular application.

The two sections may differ in that the thickness of the wall section and the remainder of the thin-walled tube in any one portion are substantially the same, but the said thicknesses in different portions are substantially different. The wall section is in all aspects preferably planar, as this makes it easier to manufacture the apertures in it, however it could be advantageous in some circumstances for the wall section to be non-planar (for example where the passageways are circular or have another curved outline).

It will be understood that features specific to the two different aspects of this invention could easily be combined, allowing the deformation behaviour of the member under impacts of various energies, and the manner in which it will absorb impact energy, to be accurately and reliably predetermined, for the purposes of removing the need to repair or replace the entire vehicle chassis except in the most severe impacts, and of maximising the safety of the vehicle occupants in the event of an impact or crash.

There may be a plurality of notches, each extending transversely around a minor proportion of the outer circumference of the tube. These act as 'initiators' in that they initiate deformation or collapse of the member at a prescribed point along the length of the member; accordingly the notches are preferably disposed in a circumferential set which is located at the same longitudinal position on the member, so that the deformation of the member is axial (along the longitude of the member) at that axial position. There may be a plurality of longitudinally-spaced sets of notches, and the notches in each set may be longitudinally-aligned, i.e. in the same plane, transverse to the axis of the member. This allows the axial compression of the member under an impact in a carefully predetermined manner.

The invention also provides a vehicle, such as a car or other automotive vehicle (van, truck, bus, coach etc.) comprising a longitudinally compressible energy absorbing member or crush box as described. Of course, when the invention is applied to vehicles of greatly different weights, sizes and/or speeds, the detailed design of the member is likely to vary considerably from what is shown in the drawings, hence the invention should be construed more broadly than what the drawings illustrate in detail.

BRIEF DESCRIPTION OF THE DRAWINGS

The invention will now be described by way of example and with reference to the accompanying figures, in which.

DETAILED DESCRIPTION OF THE EMBODIMENTS

Figure 1:
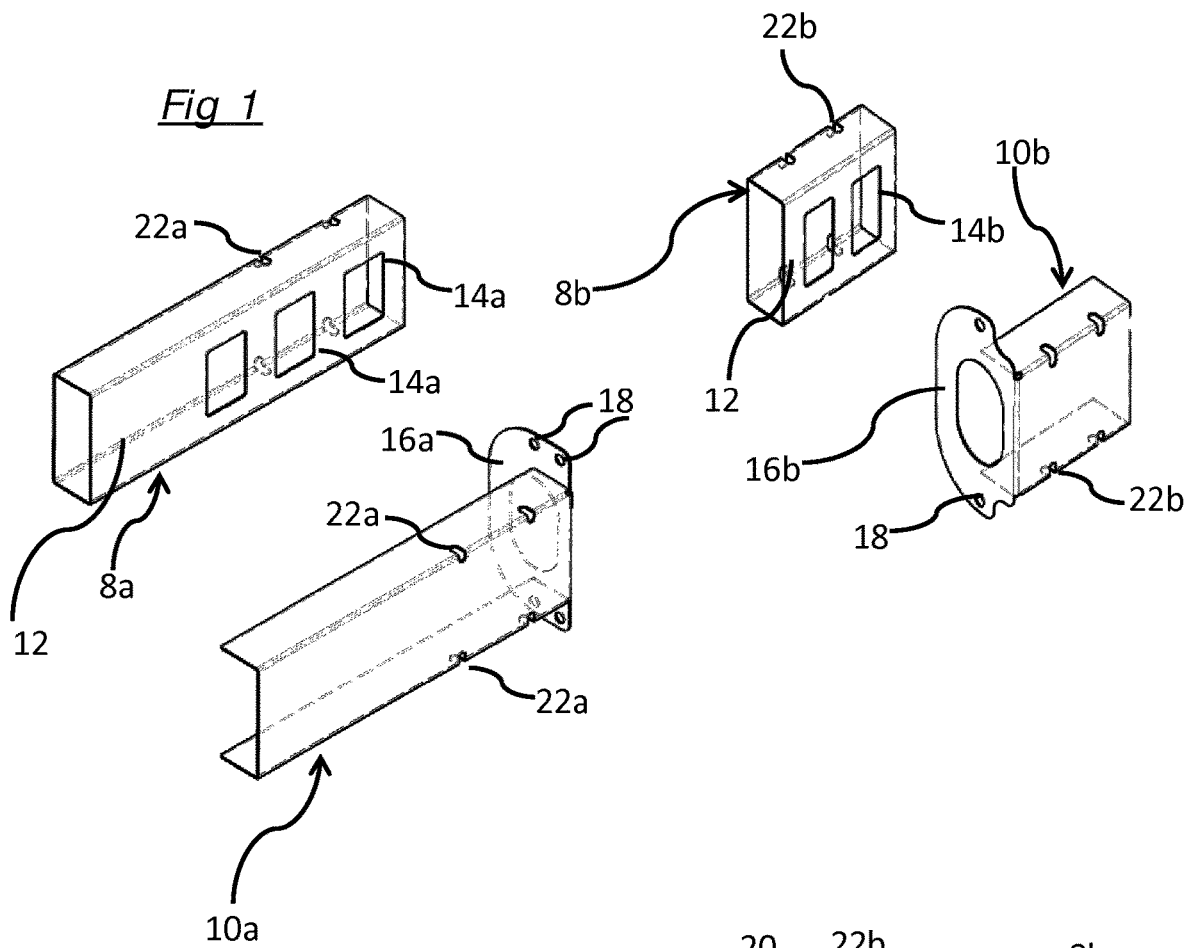
FIG. 1 is an exploded perspective view of an axially compressible energy absorbing member for a vehicle in accordance with the invention.
Figure 2:
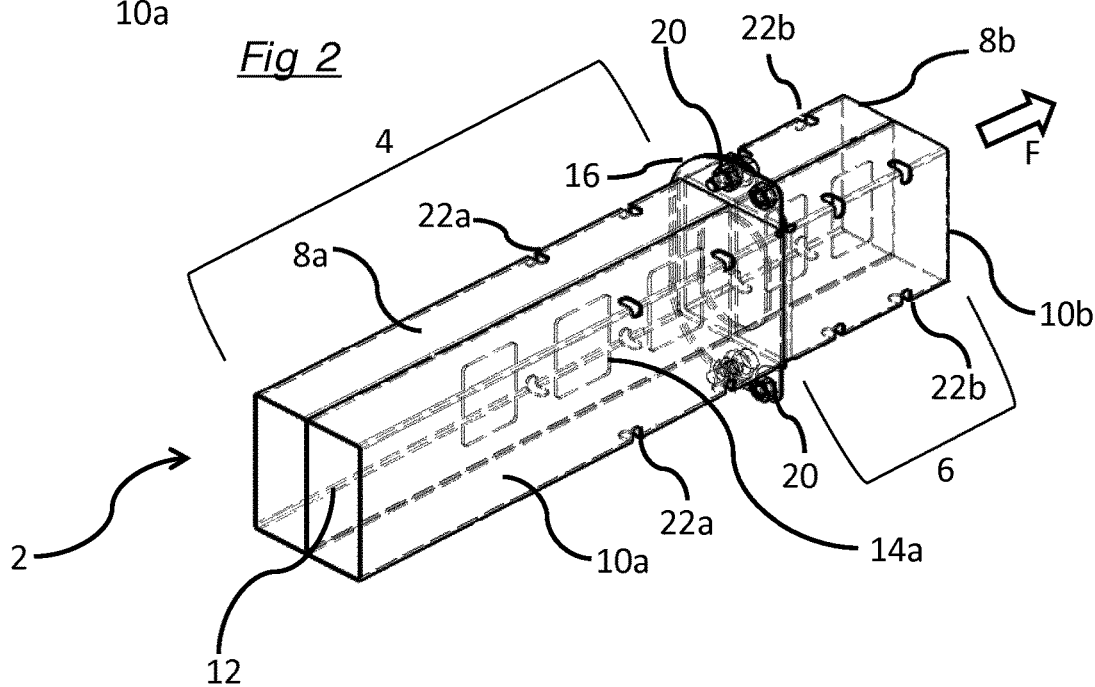
FIG. 2 is a perspective view of the member of FIG. 1 ready for use.

Referring to FIGS. 1 and 2, these show a crash rail, or longitudinally compressible energy absorbing member for a vehicle, 2 intended to be mounted to the vehicle structure or chassis (not shown) so as to point in the general direction of vehicle forward motion as indicated by arrow F in FIG. 2, and the terms "forward" and "rearward" used herein should be construed accordingly (we prefer to mount the crash rails in parallel with the direction of vehicle forward motion, but it may be advantageous in some applications to orient the crash rail at an angle, vertical and/or horizontal, to this direction). The drawings illustrate the principles of the present invention, but do not show the extreme ends of the crash rail and how these are to be mounted to the vehicle structure or chassis at one end and to the bumper at the other, since this is a straightforward design matter. The crash rail comprises a rearward, high impact energy absorbing portion 4, the elements of which are shown with reference numerals with the suffix "a", and a forward, low impact energy absorbing portion 6, the elements of which are shown with reference numerals with the suffix "b".

The portions 4, 6 of the crash rail 2 comprise a rectangular or box section tube 8, along the vertices of which are stitch welded the edges of a rectangular C-section 'tube' 10, thus forming a 'double tube' having two rectangular section passageways which extend longitudinally the entire length of the member 2, and which separated by a planar, longitudinally extending wall section, or web, 12. Several apertures, or windows, 14 are shown in the wall section 12; these weaken the wall section 12 when subjected to forces along the direction of arrow F, and are used to dictate how the member 2 deforms under impact. Because the separate tubes 8, 10 are formed separately and subsequently joined to form the member 2, the apertures 14 can be easily formed or cut in the wall section 12 before joining the separate tubes (some conventional crash rails, such as in GB2299551, are formed by extrusion, which would make the provision and accurate siting and shaping of windows 14 much more difficult, particularly where the member is lengthy). In use, the two tubes are joined to one another so as to be incapable of relative movement in any direction, particularly not in the axial or longitudinal direction.

The end of each C-section tube 10a, 10b is provided with a flange 16 provided with holes 18 whereby the two flanges can be joined together, end to end, by conventional nuts and bolts 20. Along the outer vertices of the tubes 8, 10 are laser cut notches 22.

In use, when the vehicle to which the member 2 is mounted is subject to a collision, impact or crash, the member 2 is subjected to longitudinal forces. The member is designed to deform and absorb these forces, by deforming and collapsing longitudinally. This is enabled because the tubes are of constant wall thickness in each portion, and because the notches 22 act as deformation "initiators"; the notches 22 are located around the circumference of the member 2, in a plane which is transverse to the longitudinal axis of the member 2, so that the member deforms by forming a 'crease' running transversely around the circumference of the member between the notches, and the member then collapses longitudinally in the manner of a bellows. The apertures 14 are sized, shaped and located relative to the notches 22 so as to facilitate this deformation in a predictable manner.

The member is designed and manufactured so that the forward portion 6 alone deforms under impacts below a certain energy, whereas both portions 4, 6 deform under impacts of greater energy. This means that under low energy impacts only the forward portion 6 deforms, so that after such an impact it is only necessary to remove and replace that portion 6, which is a relatively simple matter of unfastening the bolts 20. In a more severe impact, both portion 6 and portion 4 will deform, and whilst this would be more time-consuming than replacing portion 6 alone, it is far preferable to having to repair the vehicle structure of chassis. These objectives can be met by varying the thickness of the tubes, and/or the size, shape, number and/or location of the notches 22 and/or of the windows 14. Thus, the thickness of the walls in the forward portion 6 might be less than that in the rearward portion 4; the hole to wall section ratio might be greater in the forward portion than in the rearward portion, and/or there may be more notches in the forward portion than in the rearward portion. It is preferred that the passageways have exactly the same cross-sectional shape and area, as this encourages the longitudinal deformation of the member and discourages undesirable bending of the member.

The crash rail 2 is formed of any ferrous or non-ferrous material, such as steel, aluminium or aluminium alloy as appropriate, and can be of a different material to that of the vehicle structure or chassis provided the deformation characteristics of the crash rail are suitable. We have made crash rails in accordance with the invention for a compact city car having a maximum transverse dimension of about 6-8 cm, and a wall thickness of about 3-5 mm.

Forming the portions of the crash rail 2 by joining a C-shaped section to a box section also allows an internal web to be introduced relatively easily, and this web can be easily attached to the remainder of the structure. Imagine a web has been introduced into the long portion 4 of the crash rail 2 in FIG. 2, so that, seen end on from the left hand end of FIG. 2, the structure looks like a '+' surrounded by a square border; in this case, the additional internal web is formed by the horizontal part of the '+'. This internal web is formed as a plate; parallel longitudinal notches can be formed in the box section to accept the plate being welded in place on either face of the box section, leaving a plate projecting from one side of the box section. This projection is suitably the same size as the c-shaped section, which also has a matching longitudinal notch formed in it, so that when the edges of the c-shaped section are attached to the box section, the projection seats within the notch and can be joined to it.

Figure 3A:
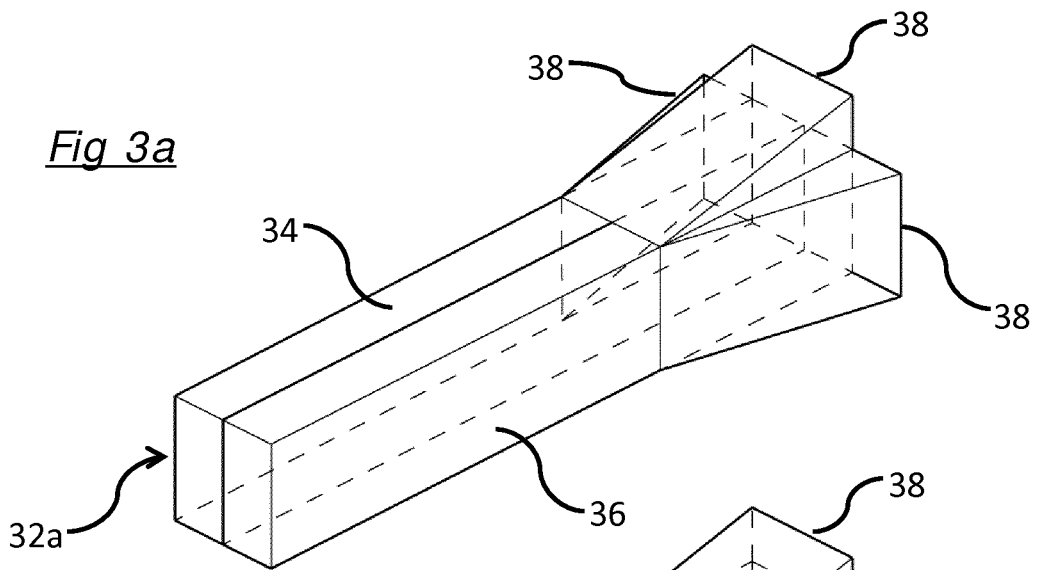
FIGS. 3a to c show three variations of the general arrangement of FIGS. 1 and 2.
Figure 3B:
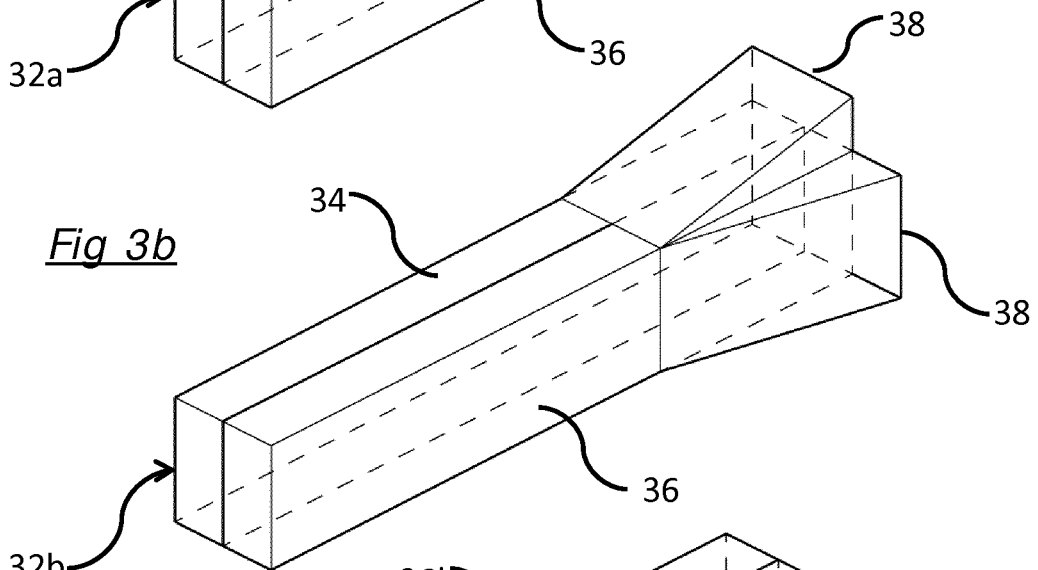
Figure 3C:
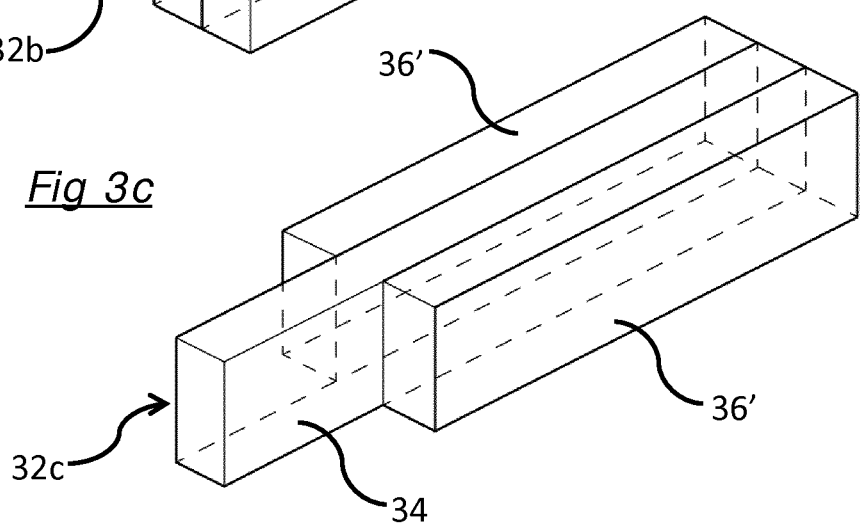

FIGS. 3a and 3b show two crash rails 32a and 32b which are similar to the member of FIG. 1, but are shown longitudinally reversed: each comprises two longitudinal, rectangular passageways formed by joining a longitudinal box section 34 to a c-shaped section 36 (other elements of the member of FIGS. 1 and 2, such as apertures and notches, are not shown in FIGS. 3a to 3c for clarity). At the rearward end of each crash rail 32a, 32b are a number of flared or tapering sections 38 which have been attached to the plane surfaces of the crash rail; in FIG. 3a there are three sections, whilst in FIG. 3b there are two. These sections, which may be disposed on any or all of the plane surfaces, in any combination, are each formed as a tapering C-shaped section, which is joined to the crash rail in any suitable manner—in the same way as the C-shaped section 36 is joined to the box section, for example. The function of these flared sections 38 is to strengthen the end of the crash rail 32a, 32b adjacent to where it is fixed to the chassis, and to spread the impact energy at the point it is transmitted into the chassis, thus reducing the likelihood or extent of any damage to the chassis in an impact.

FIG. 3c shows a crash rail 32c which represents a further variation on the general arrangement of FIGS. 1 and 2, in which there are three longitudinally extending, rectangular passageways, formed by joining two C-shaped sections 36' to either side of a box section 34. In this case, the outer C-sections 36' are shorter than is the box section 34; this provides a further tuning effect to the deformation characteristics of the crash rail 36', so that in an impact the protruding end of the box section 34 collapses initially, until the deformation of this part means that contact is made with the ends of the C-shaped sections 36', at which point all three deform so as to absorb impact energy.

It will of course be understood that many variations may be made to the above-described embodiment without departing from the scope of the present invention. For example, the tubes are shown as being rectangular in cross-section, but they could be of square or other polygonal cross section, or round or of other curved outline—though it is preferable for the outline to have vertices (longitudinal corners) if the member is to have notches, dents or creases as deformation initiating features. The apertures are shown herein as being of the same shape, namely rectangular, as this shape makes it easy to predict the deformation effect of the apertures; however, the apertures can be of any shape (square, triangular or of other polygonal shape, or circular, oval or of other curved outline) and/or of differing shape in the same member. Similarly, the apertures are shown herein as being of the same size, but they can be of different sizes (it will be appreciated that the bigger the aperture, the weaker that aperture makes the member at that point, so if the apertures increase in size along the length of the member, the member is likely to deform first where the apertures are largest in size and last where the apertures are smallest in size; this enables the deformation of the member to be accurately predetermined). The apertures are preferably aligned longitudinally, parallel to the axis of the member, as this encourages the wall section (and thus the member) to deform longitudinally rather than bending, as bending of the member along its axis would absorb less energy than longitudinal crumpling. The drawings show two longitudinal tube portions, though there could be three or more, all releasably connected end to end; in practice, two or three portions would probably represent the best compromise between impact energy absorption and ease of manufacture. The invention has been described with two longitudinally-extending passageways, but there could be three, four or more such passageways (though additional passageways make the fabrication process more complicated; an even number of passageways is preferred, as this allows longitudinal symmetry (such as four passageways which, if rectangular or square, would result in a cross-shaped internal longitudinal wall, or web, separating the passageways) and easier calculation of the deformation under impact). We use a stitch weld so that the longitudinal frequency and/or length of the welds can be arranged to suit a particular application, however a seam weld could be used in some applications. The deformation characteristics can be 'tuned' by varying the length, spacing and/or frequency of the welds and/or the notched initiators, and also by varying the thickness of the material forming the member in the longitudinal direction (whilst maintaining constant thickness circumferentially). The drawings show a design in which only the outer vertices of the rectangular and C-section tubes have notches (i.e. the vertices other than those where the tubes are welded together); it could be advantageous to provide notches on these other, 'inner', vertices, to help further control the deformation characteristics, and in this case the stitch welds could be located so as to facilitate or work in combination with this. We have described the notches as being in planes transverse to the longitudinal axis of the member, however in some applications (such as where the member is not aligned totally with the direction of forward motion of the vehicle, for example) the notches might advantageously lie in planes at an angle to the axis of the member, and the angles of these planes could vary according to their position along the axis of the member. We have described designs in which notches act as initiators; we prefer to use such initiators, as cutting into the tube material allows reasonable accuracy and predictable deformation characteristics, however dents and/or creases may be formed in the tube material to act instead of, or in any combination with, notched initiators (in our view, forming initiators is less desirable, as it is less accurate and reliable than cutting initiators). The flange joining the two portions is shown as being provided on the end of the C-section tube, but it could equally easily be provided on the ends of the other tube, or there could be flanges on both. Although described primarily in relation to automotive vehicles, it should be understood that the present invention could be applied to types of vehicles other than automotive ones, such as trains, trams, cable cars or boats. Finally, the invention has been described as a front-facing impact structure; it will be understood that the arrangement is equally suited for a rearwardly-facing impact structure (all that needs to be done is to reverse the arrangement shown in the drawings). Where different variations or alternative arrangements are described above, it should be understood that embodiments of the invention may incorporate such variations and/or alternatives in any suitable combination. For example, there may be two or three (or more) passageways in the energy absorbing member, and a member may be formed with single longitudinal sections and/or in two longitudinal portions; in any of these arrangements there may be one to four flared end sections, and/or there may be an internal, longitudinally extending web provided in one or more of the passageways.

The invention claimed is:

1. A longitudinally compressible energy absorbing member for a vehicle comprising an elongate thin-walled tube having at least two adjacent, substantially parallel, longitudinally-extending passageways defined by tube walls and separated where they are adjacent by a wall section, wherein the wall section includes one or more apertures of predetermined shape(s) and/or size(s), and wherein the thicknesses of the tube walls and of the wall section are substantially constant and the same, and wherein there are no overlapping edges.

2. A member according to claim 1 wherein the passageways have the same cross-sectional area.

3. A member according to claim 1 wherein the cross-sectional shape of the passageways is rectangular.

4. A member according to claim 1 wherein the apertures are the same shape and/or size.

5. A member according to claim 1 wherein the tube comprises two longitudinal portions which are in use releasably connected to each other end to end, wherein the two portions differ in at least their lengths.

6. A member according to claim 5 wherein the two sections differ in that the thickness of the wall section and the remainder of the thin-walled tube in each portion is substantially the same, but the thicknesses of the two portions are different.

7. A member according to claim 1 made of ferrous or non-ferrous material.

8. A member according to claim 1 made of steel, aluminium or aluminium alloy.

9. A member according to claim 1 wherein the tube comprises a plurality of notches, dents and/or creases each of which extends transversely around a minor proportion of the outer circumference of the tube and is located along the outer vertices of the tubes.

10. A member according to claim 9 wherein the notches, dents and/or creases are disposed in a set which is located at the same longitudinal position on the member.

11. A member according to claim 10 comprising a plurality of longitudinally-spaced sets of notches, dents and/or creases.

12. A member according to claim 11 wherein the notches, dents and/or creases in each set are aligned in a plane transverse to the longitudinal member.

13. A member according to claim 1 wherein the wall section is substantially planar.

14. A member according to claim 1 wherein each aperture is rectangular.

15. A vehicle comprising a longitudinally compressible energy absorbing member according to claim 1.

* * * * *